United States Patent
Subbiah et al.

(10) Patent No.: US 11,240,101 B2
(45) Date of Patent: Feb. 1, 2022

(54) AUTOMATIC FABRIC PROVISIONING SYSTEM

(71) Applicant: Dell Products L.P., Round Rock, TX (US)

(72) Inventors: Ramesh Kumar Subbiah, Tamil Nadu (IN); Vibin Varghese, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 135 days.

(21) Appl. No.: 16/705,347

(22) Filed: Dec. 6, 2019

(65) Prior Publication Data

US 2021/0176121 A1 Jun. 10, 2021

(51) Int. Cl.
*H04L 12/24* (2006.01)
*H04L 29/08* (2006.01)

(52) U.S. Cl.
CPC ...... *H04L 41/0806* (2013.01); *H04L 41/0886* (2013.01); *H04L 67/2814* (2013.01)

(58) Field of Classification Search
None
See application file for complete search history.

(56) References Cited

U.S. PATENT DOCUMENTS

| 2016/0087845 A1* | 3/2016 | Kaneriya | H04B 10/25 370/254 |
| 2017/0302739 A1* | 10/2017 | Hughes | H04L 67/1097 |
| 2017/0317918 A1* | 11/2017 | Vemula | H04L 49/357 |
| 2018/0131637 A1* | 5/2018 | Hughes | H04L 12/66 |
| 2018/0278575 A1* | 9/2018 | Varghese | H04L 12/66 |

\* cited by examiner

*Primary Examiner* — Scott B Christensen
(74) *Attorney, Agent, or Firm* — Joseph Mencher

(57) ABSTRACT

An automatic fabric provisioning system includes first uplink switch device(s) associated with a first fabric, and second uplink switch device(s) associated with a second fabric. A gateway device is coupled to each of the first and second uplink switch device(s), and transmits a respective fabric login communication to each of the first uplink switch device(s) via at least one first uplink, and to each of the second uplink switch device(s) via at least one second uplink. When the gateway device receives respective first fabric login accept communication(s) from each of the uplink switch device(s) via the at least one uplink to that uplink switch device that identifies the fabric associated with that uplink switch device, it automatically associates each at least one first uplink with the first fabric, and each at least one second uplink with the second fabric.

20 Claims, 9 Drawing Sheets

AUTOMATIC FABRIC PROVISIONING SYSTEM

BACKGROUND

The present disclosure relates generally to information handling systems, and more particularly to automatically provisioning fabrics for information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems sometimes utilize fabrics for communications. For example, a Fibre Channel (FC) switch may operate as an N_Port Identifier Virtualization (NPIV) gateway device that is connected to multiple uplink FC switch devices, with target devices connected to the uplink FC switch devices configured to communicate with end devices connected to the NPIV gateway device via fabrics assigned to the uplink FC switch devices. However, the conventional provisioning of such fabrics is a manual process that can raise a number of issues. For example, when multiple uplinks exist between the NPIV gateway device and different fabrics assigned to subsets of the uplink FC switch devices, the manual configuration of those virtual fabrics can be error prone and time consuming. To provide a specific example, when multiple uplinks exist between the NPIV gateway device and the same fabric, each of those uplinks must be configured to be part of the same virtual fabric, while when different uplinks exist between the NPIV gateway device and uplink FC switch devices in the same fabric, each of those uplinks must be configured to be part of the same virtual fabric, and when multiple uplinks exist between the NPIV gateway device and different fabrics, each of those uplinks must be configured to be part of a different virtual fabric. As will be appreciated by one of skill in the art, the provisioning of fabrics in such systems is time consuming and prone to errors.

Accordingly, it would be desirable to provide an automatic fabric provisioning system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an automatic fabric provisioning engine that is configured to: transmit, to each of at least one first uplink switch device via at least one first uplink and to each of at least one second uplink switch device via at least one second uplink, a respective fabric login communication; receive, from each of the at least one first uplink switch devices via the at least one first uplink, a respective first fabric login accept communication that identifies a first fabric associated with that first uplink switch device and, in response, automatically associate each at least one first uplink with the first fabric; and receive, from each of the at least one second uplink switch devices via the at least one second uplink, a second respective fabric login accept communication that identifies a second fabric associated with that second uplink switch device and, in response, automatically associate each at least one second uplink with the second fabric.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
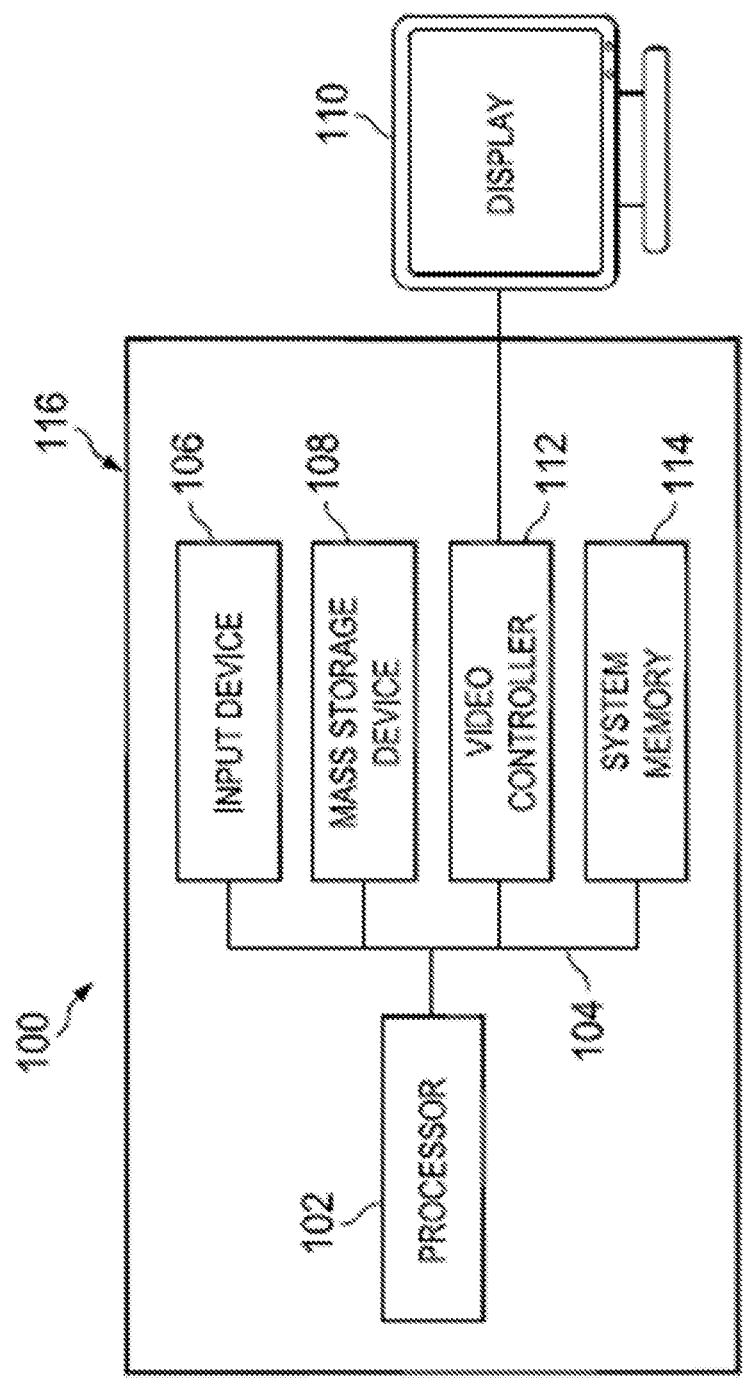
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
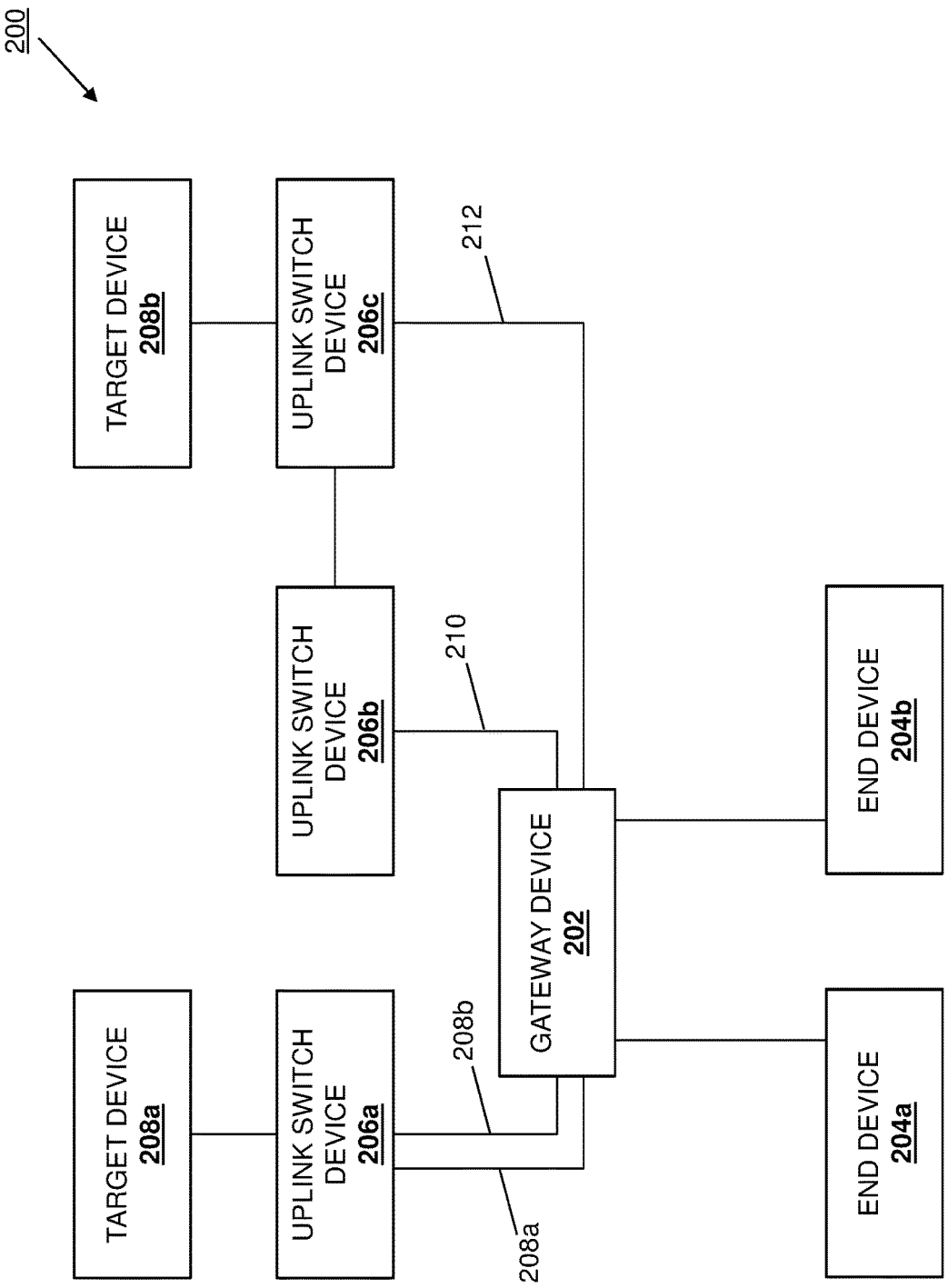
FIG. 2 is a schematic view illustrating an embodiment of an automatic fabric provisioning system

Referring now to FIG. 2, an embodiment of an automatic fabric provisioning system 200 is illustrated. In the illustrated embodiment, the automatic fabric provisioning system 200 incudes a gateway device 202. In an embodiment, the gateway device 202 may be provided by the IHS 100 discussed above with reference to FIG. 1, and/or may include some or all of the components of the IHS 100, and in a specific example may be provided by a Fibre Channel (FC) switch device that has been configured to operate as an N_Port Identifier Virtualization (NPIV) gateway device using techniques that would be apparent to one of skill in the art in possession of the present disclosure. However, while illustrated and discussed as an FC switch device configured to operate as an NPIV gateway device, one of skill in the art in possession of the present disclosure will recognize that gateway devices provided in the automatic fabric provisioning system 200 may include any devices that may be configured to operate similarly as the gateway device 202 discussed below. In the illustrated embodiment, the gateway device 202 is coupled to a pair of end devices 204a and 204b, either or both of which may be provided by the IHS 100 discussed above with reference to FIG. 1, and/or may include some or all of the components of the IHS 100, and in a specific example may be any device known in the art that is configured to communicate via an FC network like that described in the specific examples provided below.

The gateway device 202 may also be coupled to a plurality of uplink switch devices. For example, the gateway device 202 is illustrated as coupled to an uplink switch device 206a via a pair of uplinks 208a and 208b that may each be coupled to respective ports on the uplink switch device 206a as well as to respective uplink proxy N_ports on the gateway device 202. Similarly, the gateway device 202 is also illustrated as coupled to an uplink switch device 206b via an uplink 210 that may be coupled to a port on the uplink switch device 206a as well as an uplink proxy N_port on the gateway device 202, and the gateway device 202 is also illustrated as coupled to an uplink switch device 206c via an uplink 212 that may be coupled to a port on the uplink switch device 206a as well as an uplink proxy N_port on the gateway device 202, with the uplink switch devices 206b and 206 coupled to each other as well. In an embodiment, any or all of the uplink switch devices 206a-206c may be provided by the IHS 100 discussed above with reference to FIG. 1, and/or may include some or all of the components of the IHS 100, and in specific examples may be provided by FC switch devices that are "uplink" FC switch devices from the perspective of the gateway device 202. In the illustrated embodiment, respective target devices 208a and 208b are coupled to each of the uplink switch devices 206b and 206c, and either or both of the target devices 208a and 208b may be provided by the IHS 100 discussed above with reference to FIG. 1, and/or may include some or all of the components of the IHS 100, and in a specific example may be any device known in the art that is configured to communicate via an FC network like that described in the specific examples provided below. However, while a specific automatic fabric provisioning system 200 has been illustrated and described, one of skill in the art in possession of the present disclosure will recognize that the automatic fabric provisioning system of the present disclosure may include a variety of components and component configurations while remaining within the scope of the present disclosure as well.

Figure 3:
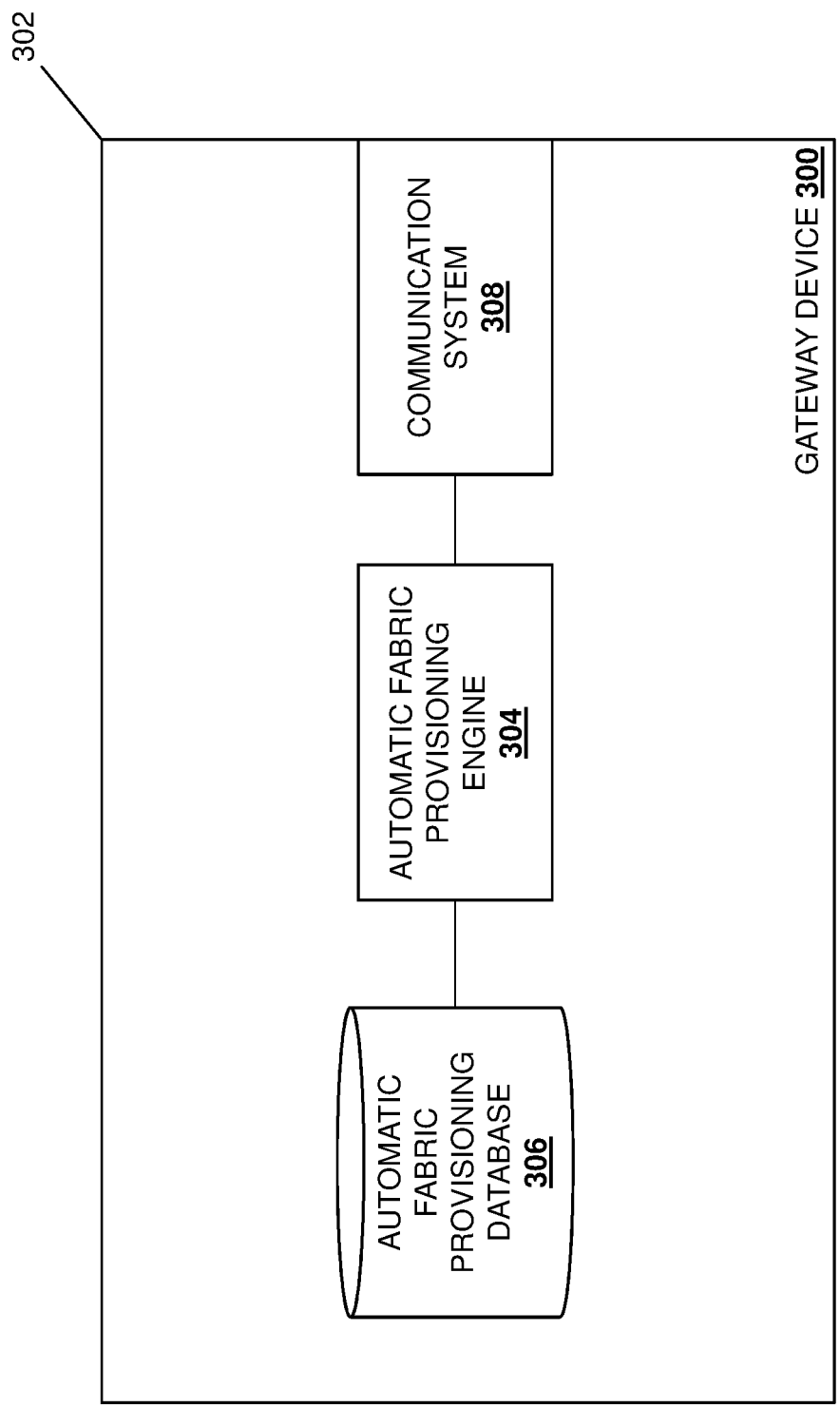
FIG. 3 is a schematic view illustrating an embodiment of a gateway device that may be provided in the automatic fabric provisioning system of FIG. 2.

Referring now to FIG. 3, an embodiment of a gateway device 300 is illustrated that may provide the gateway device 202 discussed above with reference to FIG. 2. As such, the gateway device 300 may be provided by the IHS 100 discussed above with reference to FIG. 1 and/or may include some or all of the components of the IHS 100, and in specific examples may be provided by an FC switch device that is configured to operate as an NPIV gateway device. However, while illustrated and discussed as an FC switch device that is configured to operate as an NPIV gateway device, one of skill in the art in possession of the present disclosure will recognize that the functionality of the gateway device 300 discussed below may be provided by other devices that are configured to operate similarly as the gateway device 300 discussed below. In the illustrated embodiment, the gateway device 300 includes a chassis 302 that houses the components of the gateway device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an automatic fabric provisioning engine 304 that is configured to perform the functionality of the automatic fabric provisioning engines and/or gateway devices discussed below.

The chassis 302 may also house a storage system (not illustrated, but which may include the storage 108 discussed above with reference to FIG. 1) that is coupled to the automatic fabric provisioning engine 304 (e.g., via a coupling between the storage system and the processing system) and that includes a automatic fabric provisioning database 306 that is configured to store any of the information utilized by the automatic fabric provisioning engine 304 discussed below. The chassis 302 may also house a communication system 308 that is coupled to the automatic fabric provisioning engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. For example, the communication system 308 may include the uplink proxy N_ports discussed above that may provide each uplink from the gateway device 202/300 to a respective uplink switch devices 206a-206c. However, while a specific gateway device 300 has been illustrated, one of skill in the art in possession of the present disclosure will recognize that gateway devices (or other devices operating according to the teachings of the present disclosure in a manner similar to that described below for the gateway device 300) may include a variety of components and/or component configurations for providing conventional gateway device functionality (e.g., NPIV gateway device functionality), as well as the functionality discussed below, while remaining within the scope of the present disclosure as well.

Figure 4:
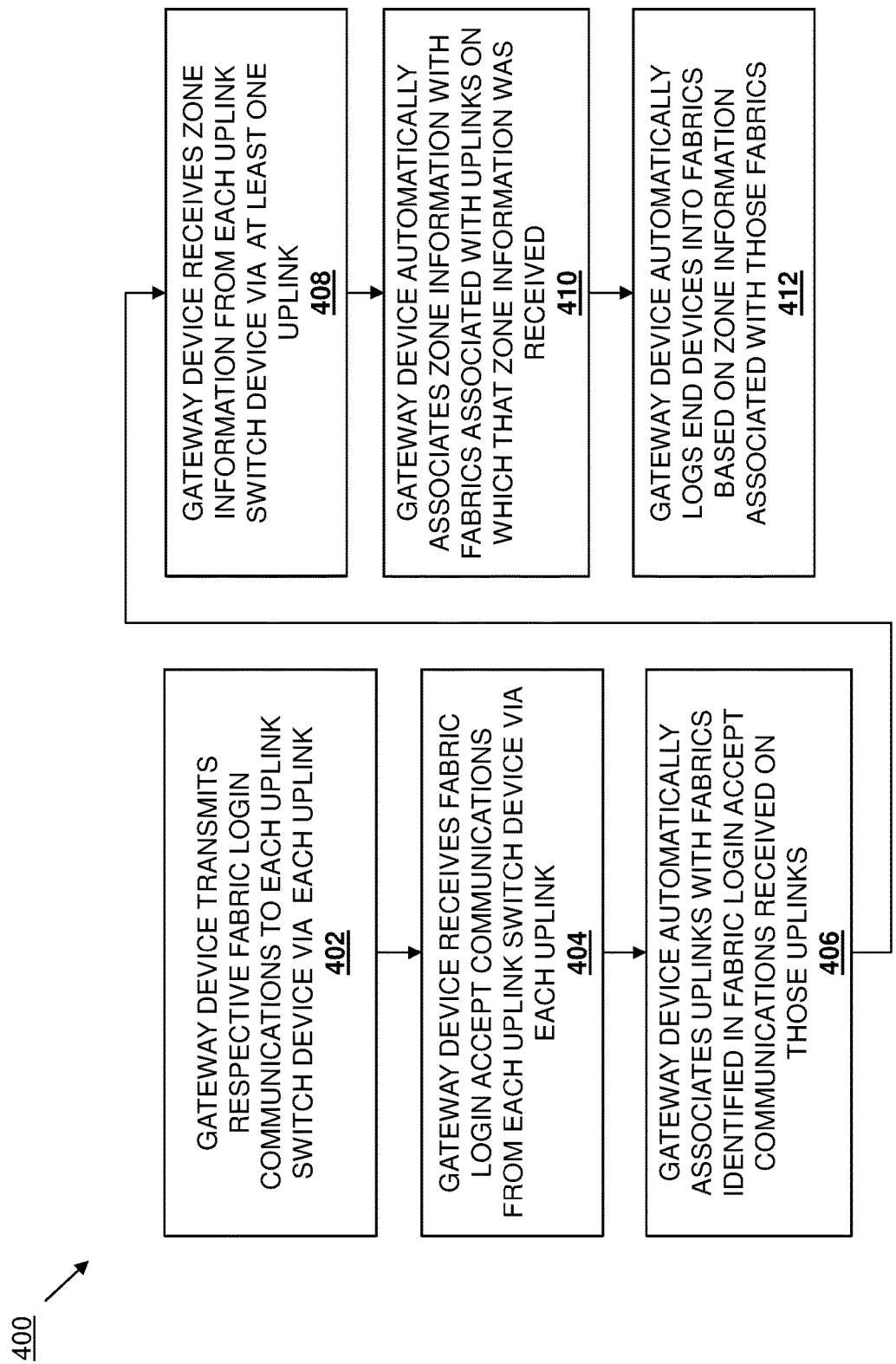
FIG. 4 is a flow chart illustrating an embodiment of a method for automatically provisioning fabrics.

Referring now to FIG. 4, an embodiment of a method 400 for automatically provisioning fabrics is illustrated. As discussed below, the systems and methods of the present disclosure provide for the automatic provisioning of fabrics via the automatic association of uplinks/ports with the fabrics to which they have access, which allows for the automatic association of devices with fabrics, and the automatic logging in of those devices to those fabrics. For example, a gateway device may transmit a respective fabric login communication to one or more first uplink switch device(s) via at least one first uplink and to one or more second uplink switch device(s) via at least one second uplink. When the gateway device receives respective first fabric login accept communication(s) from each of the uplink switch device(s) via the at least one uplink to that uplink switch device that identifies the fabric associated with that uplink switch device, it automatically associates each at least one first uplink with the first fabric, and each at least one second uplink with the second fabric. The gateway device may then receive zone information from each of the uplink switch device(s) and automatically associate the zone information with uplinks on which that zone information was received, and automatically log in end devices to fabrics based on the zone information associated with those fabrics. As such, fabric provisioning according to the systems and methods of the present disclosure is more accurate and less time consuming than conventional techniques.

Figure 5A:
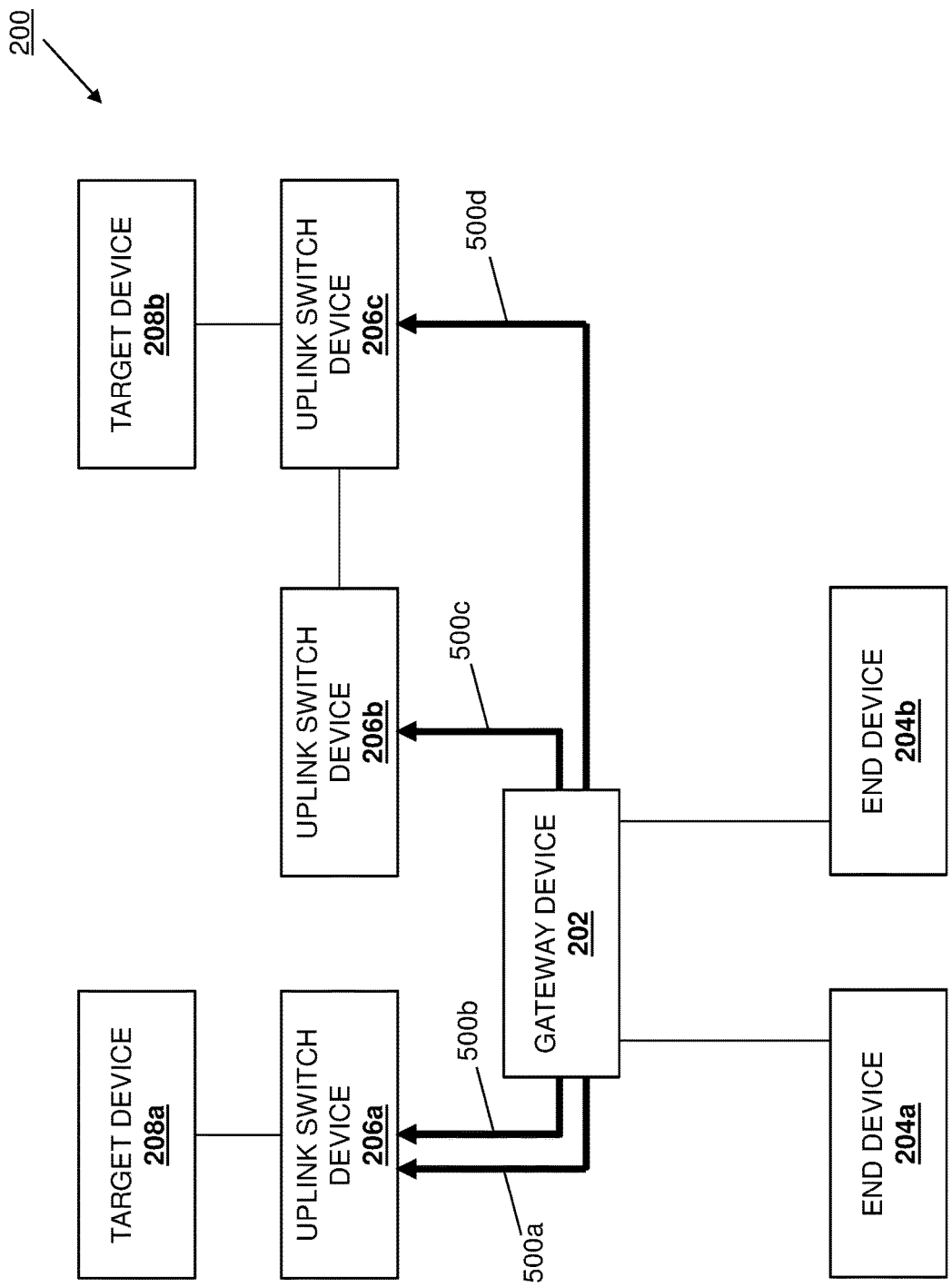
FIG. 5A is a schematic view illustrating an embodiment of the automatic fabric provisioning system of FIG. 2 operating during the method of FIG. 4.

The method 400 begins at block 402 where a gateway device transmits respective fabric login communications to each uplink switch device via each uplink. In an embodiment, during or prior to the method 400, the gateway device 202 may be connected to the end devices 204a-204b and the uplink switch devices 206a-206c, while the target devices 208a and 208b may be connected to the uplink switch devices 206a and 206b, respectively, and all of the devices in the automatic fabric provisioning system 200 may be initialized. The initialization of the devices in the automatic fabric provisioning system 200 may be followed by a fabric login process, which one of skill in the art in possession of the present disclosure will recognize is described as an FC fabric login process below, but which may be provided by other fabric login processes while remaining within the scope of the present disclosure as well. As illustrated in FIG. 5A, in an embodiment of block 402 and as part of the fabric login process, the automatic fabric provisioning engine 304 in the gateway device 202 may operate to generate and transmit respective fabric login communications 500a and 500b (e.g., FC Fabric LOGIn (FLOGI) communications) to the uplink switch device 206a via its communication system 308 (e.g., via uplink proxy N_ports) and over the uplinks 208a and 208b, respectively, to the uplink switch device 206a, may operate to generate and transmit a fabric login communication 500c (e.g., a FLOGI communication) to the uplink switch device 206b via its communication system 308 (e.g., via an uplink proxy N_port) and over the uplink 210, and may operate to generate and transmit a fabric login communication 500d (e.g., a FLOGI communication) to the uplink switch device 206c via its communication system 308 (e.g., via an uplink proxy N_port) and over the uplink 212. As such, at block 402, each of the uplink switch devices 206a-206c may receive a fabric login communication from the gateway dative 202 via each uplink that couples that uplink switch device to the gateway device 202.

The method 400 then proceeds to block 404 where the gateway device receives fabric login accept communications from each uplink switch device via each uplink. In an embodiment, at block 404 and as part of the fabric login process following the transmission and receipt of the fabric login communications, each uplink switch device 206a-206c may generate and transmit a fabric login accept communication (e.g., a Fabric LOGIn Link Service ACCept (FLOGI LS_ACC) to the gateway dative 202 via each uplink that couples that uplink switch device to the gateway device 202. As discussed in further detail below, the fabric login accept communications transmitted by the uplink switch devices 206a-206c may identify a fabric to which the uplink switch device transmitting that fabric login accept communication is assigned. As will be appreciated by one of skill in the art in possession of the present disclosure, each of the uplink switch devices 206a-206c may have been assigned a fabric by a user or other administrator of the automatic fabric provisioning system 200 during or prior to the method 400, with the examples below including the uplink switch device 206a having been assigned to a first fabric, and the uplink switch devices 206b and 206c having been assigned to a second fabric that is different than the first fabric.

Figure 5B:
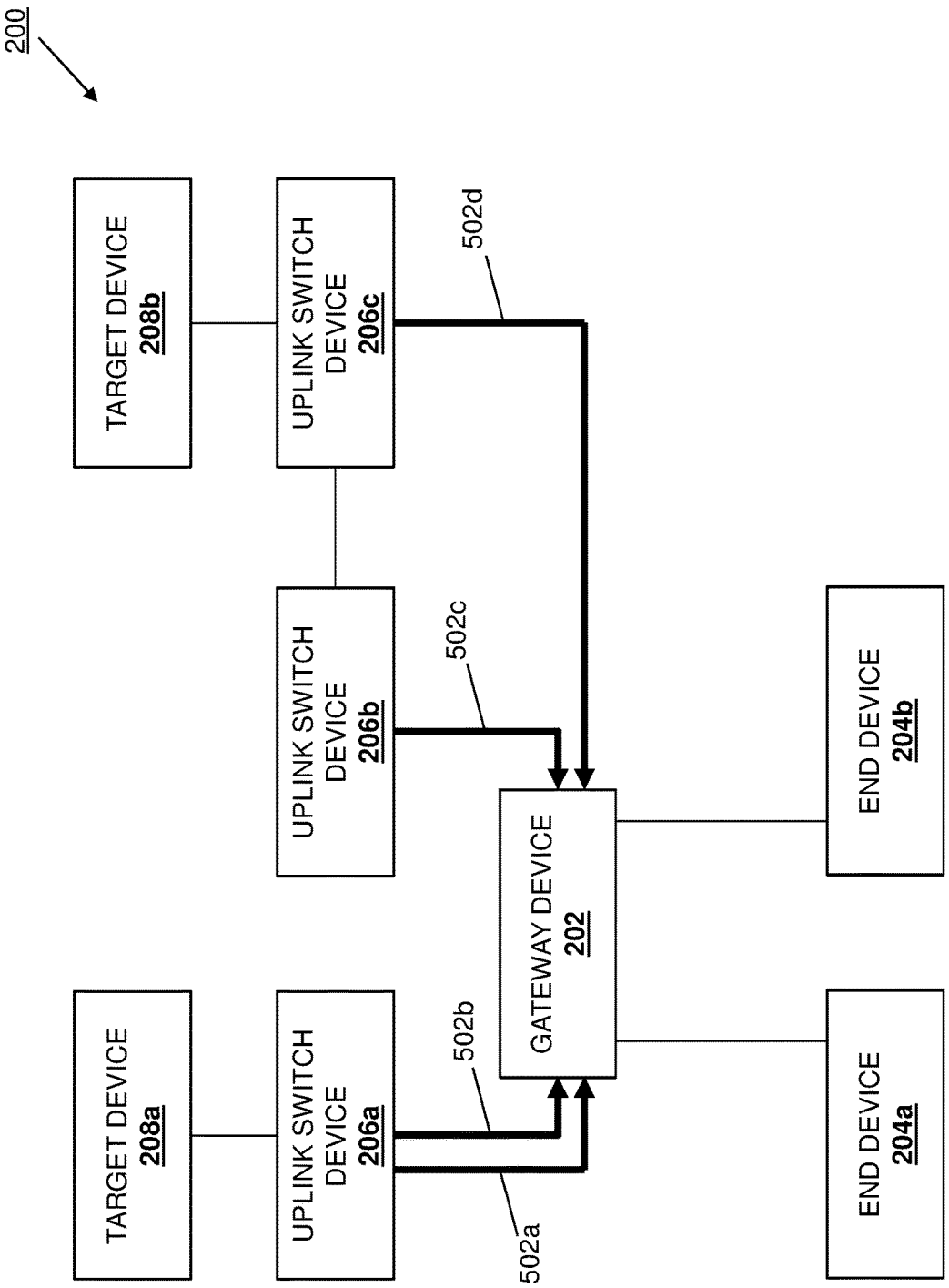
FIG. 5B is a schematic view illustrating an embodiment of the automatic fabric provisioning system of FIG. 2 operating during the method of FIG. 4.

As such, as illustrated in FIG. 5B, in an embodiment of block 404 and as part of the fabric login process, the uplink switch device 206a may operate to generate and transmit respective fabric login accept communications 502a and 502b (e.g., FLOGI LS_ACC communications that identify the first fabric to which the uplink switch device 206a has been assigned) to the gateway device 202 via the uplinks 208a and 208b, respectively, the uplink switch device 206b may operate to generate and transmit a fabric login accept communication 502c (e.g., a FLOGI LS_ACC communication that identifies the second fabric to which the uplink switch device 206a has been assigned) to the gateway device 202 via the uplink 210, and the uplink switch device 206c may operate to generate and transmit a fabric login accept communication 502d (e.g., a FLOGI LS_ACC communication that identifies the second fabric to which the uplink switch device 206a has been assigned) to the gateway device 202 via the uplink 212. As such, at block 404, the automatic fabric provisioning engine 304 in the gateway device 202/300 may receive each of the fabric login accept communications 502a-502d via its communication system 308.

Continuing with the specific example provided above, the fabric login accept communications 502a and 502b transmitted by the uplink switch device 206a/300 may include a first fabric World Wide Name (WWN) that identifies the first fabric, while the fabric login accept communication 502c transmitted by the uplink switch device 206b/300 may include a second fabric WWN that identifies the second fabric, and the fabric login accept communication 502d transmitted by the uplink switch device 206c/300 may include the second fabric WWN that identifies the second fabric as well. Furthermore, one of skill in the art in possession of the present disclosure will appreciate that fabric login accept communications (e.g., FLOGI LS_ACC communications) may include other information (e.g., a unique port WWN for each port upon which a fabric login accept communication is transmitted via an uplink to the gateway device 202, etc.) while remaining within the scope of the present disclosure as well. However, while a particular type of fabric login accept communication has been described, one of skill in the art in possession of the present disclosure will appreciate that fabrics that have been assigned to an uplink switch device may be identified in other ways that will fall within the scope of the present disclosure as well.

Figure 5C:
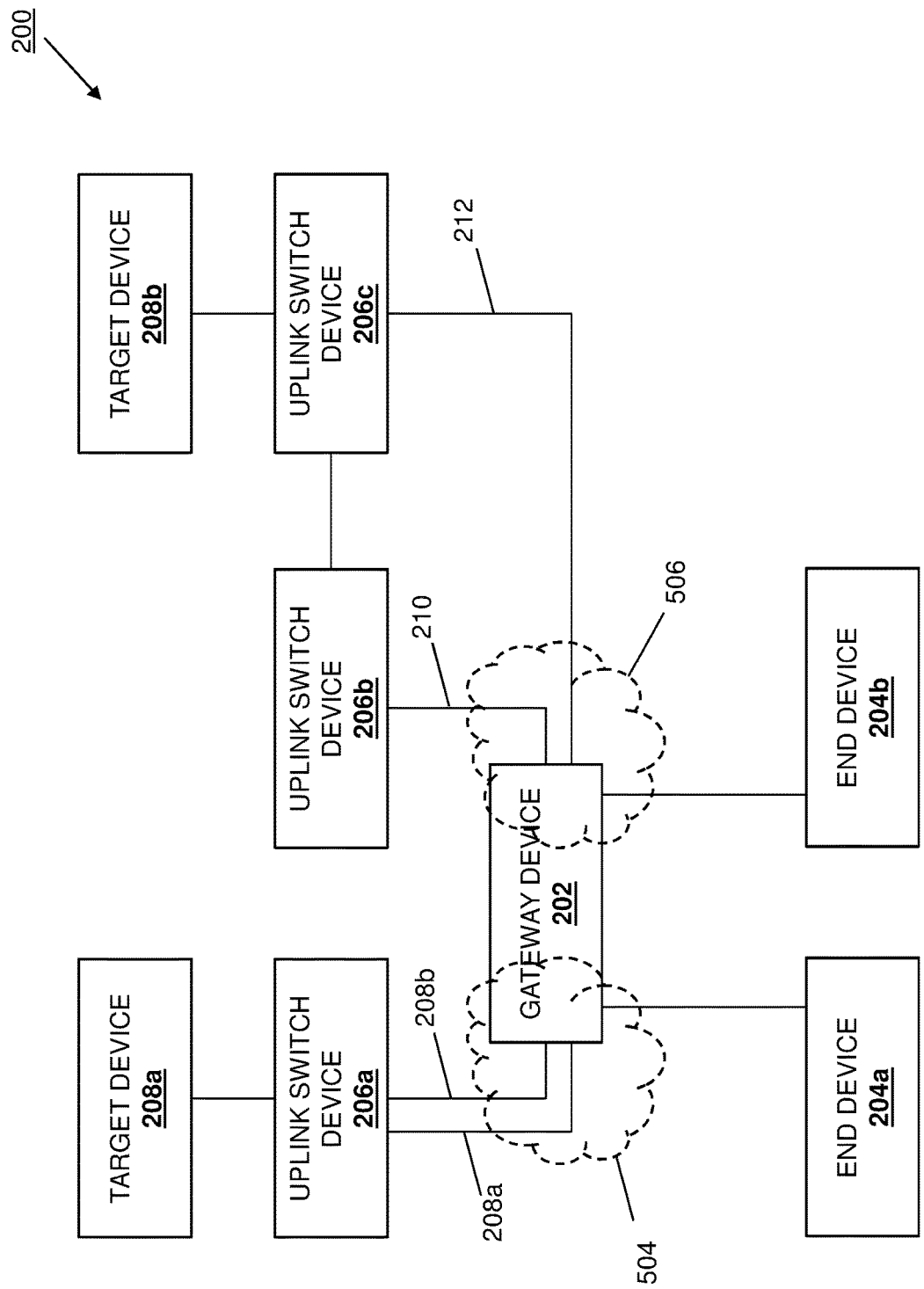
FIG. 5C is a schematic view illustrating an embodiment of the automatic fabric provisioning system of FIG. 2 operating during the method of FIG. 4.

The method 400 then proceeds to block 406 where the gateway device automatically associates uplinks with fabrics identified in the fabric login accept communications received on those uplinks. In an embodiment, at block 406 and in response to receiving the fabric login accept communications from the uplink switch devices 206a-206c, the automatic fabric provisioning engine 304 in the gateway device 202/300 may operate to automatically associate (e.g., without receiving an instruction to do so from a user or administrator subsequent to the beginning of the fabric login process) each of the uplinks 208a, 208b, 210, and 212 with the fabrics identified in the fabric login accept communications received on those uplinks. With reference to FIG. 5C and continuing with the example provided above, in response to receiving the fabric login accept communications 502a and 502b via the uplinks 208a and 208b, respectively, from the uplink switch device 206a and determining that each of those fabric login accept communications 502a and 502b identifies the first fabric (e.g., via the first fabric WWN discussed above), the automatic fabric provisioning engine 304 in the gateway device 202/300 may operate to automatically associate each of the uplinks 208a and 208b (e.g., the respective uplink proxy N_ports that provide those uplinks 208a and 208b) with the first fabric via a first virtual fabric 504. As will be appreciated by one of skill in the art in possession of the present disclosure, the automatic association of the uplinks 208a and 208b with the first fabric via the first virtual fabric 504 may be accomplished by the automatic fabric provisioning engine 304 in the gateway device 202/300 having the respective uplink proxy N_ports that provide those uplinks 208a and 208b automatically log into the first fabric via their respective uplinks 208a and 208b.

Similarly, in response to receiving the fabric login accept communication 502c via the uplink 210 from the uplink switch device 206b and determining that the fabric login accept communication 502c identifies the second fabric (e.g., via the second fabric WWN discussed above), the automatic fabric provisioning engine 304 in the gateway device 202/300 may operate to automatically associate the uplink 210 (e.g., the uplink proxy N_port that provides that uplink 210) with the second fabric via a second virtual fabric 506, and in response to receiving the fabric login accept communication 502d via the uplink 212 from the uplink switch device 206c and determining that the fabric login accept communication 502d identifies the second fabric (e.g., via the second fabric WWN discussed above), the automatic fabric provisioning engine 304 in the gateway device 202/300 may operate to automatically associate the uplink 212 (e.g., the uplink proxy N_port that provides that uplink 212) with the second fabric via the second virtual fabric 506. As will be appreciated by one of skill in the art in possession of the present disclosure, the automatic association of the uplinks 210 and 212 with the second fabric via a second virtual fabric 506 may be accomplished by the automatic fabric provisioning engine 304 in the gateway device 202/300 having the respective uplink proxy N_ports that provide those uplinks 210 and 212 automatically log into the second fabric via their respective uplinks 210 and 212.

As such, in the specific example provided above, the multiple uplinks 208a and 208b that connect to the uplink switch device 206a that is assigned to the first fabric are each automatically associated with the first fabric via the first virtual fabric 504, the different uplinks 210 and 212 that are connected to the uplink switch devices 206b and 206c, respectively, that are both assigned to the second fabric are each automatically associated with the second fabric via the second virtual fabric 504, with different uplinks (i.e., 208a/208b and 210/212) that connect to uplink switch devices (i.e., 206a and 206b/206c, respectively) that are assigned to different fabrics (i.e., the first fabric and the second fabric) automatically associated with those different fabrics via different virtual fabrics (i.e., the first virtual fabric 504 and the second virtual fabric 506.) However, while a specific example of a fabric login process according to the teachings of the present disclosure has been provided, one of skill in the art in possession of the present disclosure will appreciate that the teachings of the present disclosure may be applied to a variety of fabric provisioning system configurations in order to automatically associate uplinks with fabrics to complete a fabric login process in a manner similar to that described above while remaining within the scope of the present disclosure.

The method 400 then proceeds to block 408 where the gateway device receives zone information from each uplink switch device via at least one uplink. In an embodiment, at block 408 and following the fabric login process, each uplink switch device 206a-206c may transmit zone information to the gateway dative 202 via each uplink that couples that uplink switch device to the gateway device 202. For example, the zone information may be transmitted by the uplink switch devices 206a-206c in response to an Extended Link Service (ELS) request from the gateway device 202 that requests zones to which the gateway device 202 belongs (e.g., an ELS request for zone information for any zone that includes the gateway device 202 by identifying a gateway WWN of the gateway device 202 as part of that zone.) As will be appreciated by one of skill in the art in possession of the present disclosure, the zone information transmitted by the uplink switch devices 206a-206c at block 408 may identify zones that have been provided for each of the uplink switch devices and that operate to define which devices (e.g., the end devices 204a/204b and the target devices 208a/208b) may communicate via that uplink switch device. As will be appreciated by one of skill in the art in possession of the present disclosure, each of the uplink switch devices 206a-206c may have been provided a zone by a user or other administrator of the automatic fabric provisioning system 200 during or prior to the method 400, with the examples below including the uplink switch device 206a having been provided a first zone that includes/identifies the end device 204a and the target device 208a (and the gateway device 202), and the uplink switch devices 206b and 206c having been provided a second zone that is different than the first zone and that includes/identifies the end device 204b and the target device 208b (and the gateway device 202).

Figure 6:
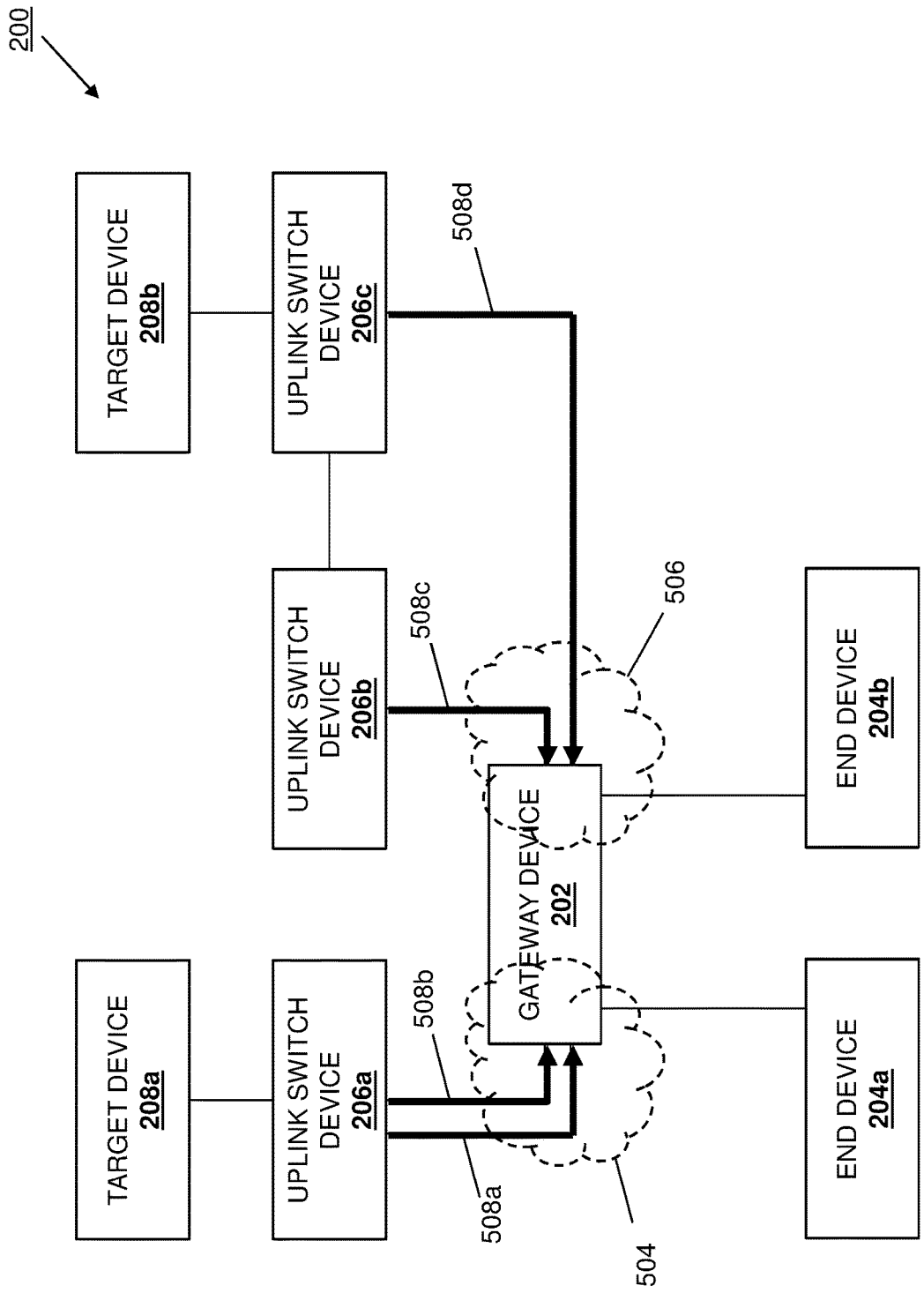
FIG. 6 is a schematic view illustrating an embodiment of the automatic fabric provisioning system of FIG. 2 operating during the method of FIG. 4.

As such, as illustrated in FIG. 6, in an embodiment of block 408 and following the fabric login process, the uplink switch device 206a may operate to generate and transmit respective zone information 508a and 508b via the respective uplinks 208a and 208b that identifies the first zone that allows for communications between the end device 204a and the target device 208a via the uplink switch device 206a, the uplink switch device 206b may operate to generate and transmit zone information 508c via the uplink 210 that identifies the second zone that allows for communications between the end device 204b and the target device 208b via the uplink switch device 206b, and the uplink switch device 206c may operate to generate and transmit zone information 212 via the uplink 210 that identifies the second zone that allows for communications between the end device 204b and the target device 208b via the uplink switch device 206b. As such, at block 408, the automatic fabric provisioning engine 304 in the gateway device 202/300 may receive the zone information transmitted by the uplink switch devices 206a-206c via its communication system 308.

The method 400 then proceeds to block 410 where the gateway device automatically associates zone information with fabrics associated with uplinks on which that zone information was received. In an embodiment, at block 410 and in response to receiving the zone information 508a and 508b from the uplink switch device 206a, the automatic fabric provisioning engine 304 in the gateway device 202/300 may operate to automatically associate (e.g., without receiving an instruction to do so from a user or administrator subsequent to the beginning of the fabric login process) that zone information 508a and 508b with the first zone that was associated with the uplinks 208a and 208b on which that zone information 508a and 508b was received by, for example, automatically associating the zone information 508a and 508b with the first virtual fabric 504. In a specific example, the automatically association of the zone information 508a and 508b with the first virtual fabric 504 at block 410 may include automatically associating the end device 204a and the target device 208a (that are included in the first zone to allow them to communication via the uplink switch device 206a) with the first virtual fabric 504 in a zone/virtual fabric mapping table that is stored in the automatic fabric provisioning database 306.

Similarly, at block 410 and in response to receiving the zone information 508c from the uplink switch device 206b and the zone information 508d from the uplink switch device 206c, the automatic fabric provisioning engine 304 in the gateway device 202/300 may operate to automatically associate (e.g., without receiving an instruction to do so from a user or administrator subsequent to the beginning of the fabric login process) that zone information 508c and 508d with the second zone that was associated with the uplinks 210 and 212 on which that zone information 508c and 508d was received by, for example, automatically associating the zone information 508c and 508d with the second virtual fabric 506. In a specific example, the association of the zone information 508c and 508d with the second zone 506 at block 410 may include automatically associating the end device 204b and the target device 208b (that are included in the second zone to allow them to communication via the uplink switch devices 206b and/or 206c) with the second virtual fabric 506 in a zone/virtual fabric mapping table that is stored in the automatic fabric provisioning database 306. As such, in specific examples utilizing the zone/virtual fabric mapping table in the automatic fabric provisioning database 306 discussed above, following block 410 that zone/virtual fabric mapping table may map the end device 204a and target device 208a to the first virtual fabric 504, and may map the end device 204b and target device 208b to the second virtual fabric 506.

The method 400 then proceeds to block 412 where the gateway device automatically logs end devices into fabrics based on zone information associated with those fabrics. In an embodiment, at block 412 and following the association of the zone information with the fabrics at block 410, the automatic fabric provisioning engine 304 in the gateway device 202/300 may operate to automatically log in (e.g., without receiving an instruction to do so from a user or administrator subsequent to the beginning of the fabric login process) the end devices 204a and 204b to a fabric based on the zone information associated with that fabric. Continuing with the example provided above, the automatic fabric provisioning engine 304 in the gateway device 202/300 may operate to automatically exchange proxied login communications (e.g., beginning with a Fabric DISCovery (FDISC) communication transmitted by the gateway device 202) with the uplink switch device 206a via one of the uplinks 208a and 208b (e.g., the proxied login communications 510a exchanged via the uplink 208a illustrated in FIG. 7) to log the end device 204a into the first fabric (e.g., via a proxied login to the first virtual fabric 504.)

Figure 7:
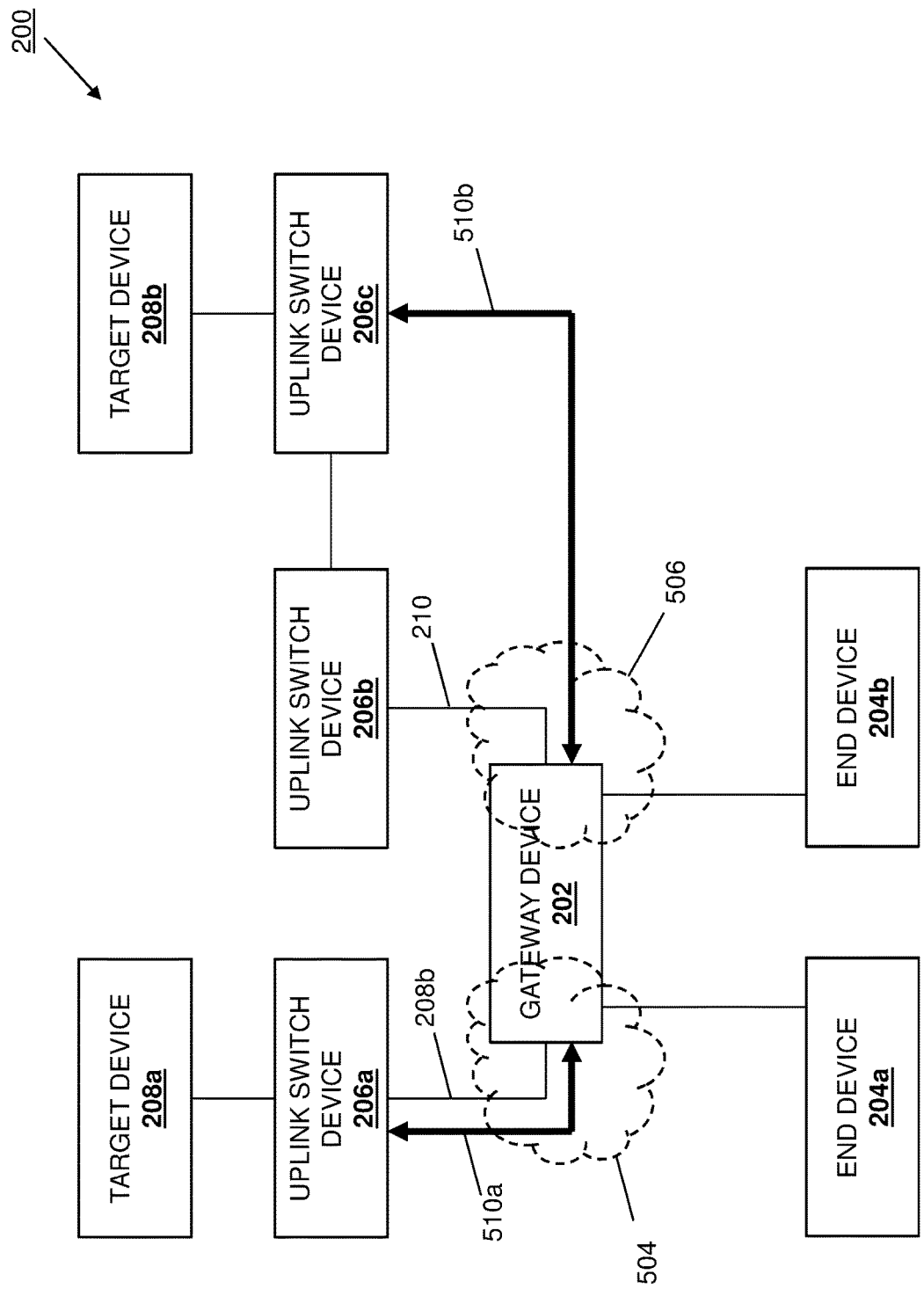
FIG. 7 is a schematic view illustrating an embodiment of the automatic fabric provisioning system of FIG. 2 operating during the method of FIG. 4.

Similarly, the automatic fabric provisioning engine 304 in the gateway device 202/300 may operate to automatically exchange proxied login communications (e.g., beginning with an FDISC communication transmitted by the gateway device 202) with one of the uplink switch devices 206b or 206c via a respective uplink 210 or 212 (e.g., the proxied login communications 510b exchanged via the uplink 212 with the uplink switch device 206c illustrated in FIG. 7) to log the end device 204b into the second fabric (e.g., via a proxied login to the second virtual fabric 506.) As such, the "downlinks" between the gateway device 202 and the end devices 204a and 204b may be automatically configured (e.g., by logging the end devices into particular fabrics) based on both the association of fabrics with the uplinks 208a, 208b, 210, and 212, and the association of zone information with the fabrics. As will be appreciated by one of skill in the art in possession of the present disclosure, following block 412 the end device 204a may communicate with the target device 208a via the first fabric, and the end device 204b may communicate with the target device 208b via the second fabric, with multiple uplinks to the same fabric utilized for load balancing.

Thus, systems and methods have been described that provide for the automatic provisioning of FC fabrics via the automatic association of uplinks/ports with the FC fabrics to which they have access, which allows for the automatic association of end devices and target devices with FC fabrics and the automatic logging in of those end devices to those FC fabrics. For example, an NPIV gateway device transmits a respective fabric login communication to one or more first uplink FC switch device(s) via at least one first uplink and to one or more second uplink FC switch device(s) via at least one second uplink. When the NPIV gateway device receives respective first fabric login accept communication(s) from each of the uplink FC switch device(s) via the at least one uplink to that uplink FC switch device that identifies the FC fabric associated with that uplink FC switch device, it automatically associates each at least one first uplink with the first FC fabric, and each at least one second uplink with the second FC fabric. The NPIV gateway device may then receive zone information from each of the uplink FC switch device(s) and associate the zone information with uplinks on which that zone information was received, and automatically log in end devices to FC fabrics based on the zone information associated with those FC fabrics. As such, fabric provisioning using the systems and methods of the present disclosure is more accurate and less time consuming than conventional techniques Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An automatic fabric provisioning system, comprising:
   at least one first uplink switch device that is associated with a first fabric;
   at least one second uplink switch device that is associated with a second fabric; and
   a gateway device that is coupled to each of the at least one first uplink switch device and the at least one second uplink switch device, wherein the gateway device is configured, automatically and without user intervention, to:
   transmit, to each of the at least one first uplink switch devices via a plurality of first uplinks and to each of the at least one second uplink switch devices via a plurality of second uplinks, a respective fabric login communication;
   receive, from each of the at least one first uplink switch devices via the plurality first uplinks, a respective first fabric login accept communication that identifies the first fabric associated with that first uplink switch device and, in response, automatically associate each one of the plurality of first uplinks with the first fabric via a first virtual fabric created at the gateway device; and
   receive, from each of the at least one second uplink switch devices via the plurality second uplinks, a second respective fabric login accept communication that identifies the second fabric associated with that second uplink switch device and, in response, automatically associate each one of the plurality of second uplinks with the second fabric via a second virtual fabric created at the gateway device.

2. The system of claim 1, wherein the gateway device is configured to:
   receive, from each of the at least one first uplink switch devices via the plurality first uplinks, respective first zone information and, in response, automatically associate the respective first zone information with the first fabric via the first virtual fabric; and
   receive, from each of the at least one second uplink switch devices via the plurality second uplinks, respective second zone information and, in response, automatically associate the respective second zone information with the second fabric via the second virtual fabric.

3. The system of claim 2, wherein the respective first zone information identifies a first end device and a first target device that belong to a first zone, and wherein the automatically associating the respective first zone information with the first fabric includes automatically associating the first end device and the first target device with the first virtual fabric.

4. The system of claim 2, wherein the gateway device is configured to:
   automatically log in, via the plurality first uplinks and based on the first zone information associated with the first virtual fabric, at least one first end device to the first fabric; and
   automatically log in, via the plurality second uplinks and based on the second zone information associated with the second virtual fabric, at least one second end device to the second fabric.

5. The system of claim 4, wherein the automatically logging in the at least one first end device to the first fabric includes transmitting a first proxied login communication via one of the plurality first uplinks, and wherein the automatically logging in the at least one second end device to the second fabric includes transmitting a second proxied login communication via one of the plurality of second uplinks.

6. The system of claim 1, wherein each first fabric login accept communication identifies the first fabric associated with that first uplink switch device using a first fabric World Wide Name (WWN) to create the first virtual fabric, and wherein each second fabric login accept communication identifies the second fabric associated with that second uplink switch device using a second fabric WWN to create the second virtual fabric.

7. An Information Handling System (IHS), comprising:
   a processing system; and
   a memory system that is coupled to the processing system and that includes instructions that, when executed by the processing system, cause the processing system to provide an automatic fabric provisioning engine that is configured, automatically and without user intervention, to:
   transmit, to each of at least one first uplink switch device via a plurality of first uplinks and to each of at least one second uplink switch device via a plurality of second uplinks, a respective fabric login communication;
   receive, from each of the at least one first uplink switch devices via the plurality of first uplinks, a respective first fabric login accept communication that identifies a first fabric associated with that first uplink switch device and, in response, automatically associate each one of the plurality of first uplinks with the first fabric via a creation of a first virtual fabric; and
   receive, from each of the at least one second uplink switch devices via the plurality of second uplinks, a second respective fabric login accept communication that identifies a second fabric associated with that second uplink switch device and, in response, automatically associate each one of the plurality of second uplinks with the second fabric via a creation of a second virtual fabric.

8. The IHS of claim 7, wherein the automatic fabric provisioning engine is configured to:
   receive, from each of the at least one first uplink switch devices via the plurality of first uplinks, respective first zone information and, in response, automatically associate the respective first zone information with the first fabric via the first virtual fabric; and
   receive, from each of the at least one second uplink switch devices via the plurality of at least one second uplinks, respective second zone information and, in response, automatically associate the respective second zone information with the second fabric via the second virtual fabric.

9. The IHS of claim 8, wherein the respective first zone information identifies a first end device and a first target device that belong to a first zone, and wherein the automatically associating the respective first zone information with the first fabric includes automatically associating the first end device and the first target device with the first virtual fabric.

10. The IHS of claim 8, wherein the automatic fabric provisioning engine is configured to:
automatically log in, via the plurality first uplinks and based on the first zone information associated with the first fabric, at least one first end device to the first virtual fabric; and
automatically log in, via the plurality second uplinks and based on the second zone information associated with the second fabric, at least one second end device to the second virtual fabric.

11. The IHS of claim 10, wherein the automatically logging in the at least one first end device to the first fabric includes transmitting a first proxied login communication via one of the plurality first uplinks, and wherein the automatically logging in the at least one second end device to the second fabric includes transmitting a second proxied login communication via one of the plurality of second uplinks.

12. The IHS of claim 7, wherein each first fabric login accept communication identifies the first fabric associated with that first uplink switch device using a first fabric World Wide Name (WWN) to create the first virtual fabric, and wherein each second fabric login accept communication identifies the second fabric associated with that second uplink switch device using a second fabric WWN to create that second virtual fabric.

13. The IHS of claim 7, wherein each one of the plurality of first uplinks and each one of the plurality of second uplinks is provided by a respective uplink proxy N_port.

14. A method for automatically provisioning fabrics, comprising:
transmitting, by a gateway device to each of at least one first uplink switch device via a plurality of first uplinks and to each of at least one second uplink switch device via a plurality of second uplinks, a respective fabric login communication automatically and without user intervention;
receiving, by the gateway device automatically and without user intervention and from each of the at least one first uplink switch devices via the plurality of first uplinks, a respective first fabric login accept communication that identifies a first fabric associated with that first uplink switch device and, in response, associating each one of the plurality of first uplinks with the first fabric via a first virtual fabric created at the gateway device automatically and without user intervention; and
receiving, by the gateway device automatically and without user intervention and from each of the at least one second uplink switch devices via the plurality of second uplinks, a second respective fabric login accept communication that identifies a second fabric associated with that second uplink switch device and, in response, associating each one of the plurality of second uplinks with the second fabric via a first virtual fabric created at the gateway device automatically and without user intervention.

15. The method of claim 14, further comprising:
receiving, by the gateway device automatically and without user intervention and from each of the at least one first uplink switch devices via the plurality of first uplinks, respective first zone information and, in response, associating the respective first zone information with the first fabric via the first virtual fabric automatically and without user intervention; and
receiving, by the gateway device automatically and without user intervention and from each of the at least one second uplink switch devices via the plurality of second uplinks, respective second zone information and, in response, associating the respective second zone information with the second fabric via the second virtual fabric automatically and without user intervention.

16. The method of claim 15, wherein the respective first zone information identifies a first end device and a first target device that belong to a first zone, and wherein the automatically associating the respective first zone information with the first fabric includes automatically associating the first end device and the first target device with the first virtual fabric.

17. The method of claim 15, further comprising:
automatically logging in, by the gateway device via the plurality of first uplinks and based on the first zone information associated with the first fabric, at least one first end device to the first virtual fabric automatically and without user intervention; and
automatically logging in, by the gateway device via the plurality of second uplinks and based on the second zone information associated with the second fabric, at least one second end device to the second virtual fabric automatically and without user intervention.

18. The method of claim 17, wherein the automatically logging in the at least one first end device to the first fabric automatically and without user intervention includes transmitting a first proxied login communication via one of the plurality of first uplinks, and wherein the automatically logging in the at least one second end device to the second fabric automatically and without user intervention includes transmitting a second proxied login communication via one of the plurality of second uplinks.

19. The method of claim 14, wherein each first fabric login accept communication identifies the first fabric associated with that first uplink switch device using a first fabric World Wide Name (WWN) to create the first virtual fabric, and wherein each second fabric login accept communication identifies the second fabric associated with that second uplink switch device via a second fabric WWN to create the second virtual fabric.

20. The method of claim 14, wherein each one of the plurality of first uplinks and each one of the plurality of second uplinks is provided by a respective uplink proxy N_port.

* * * * *